(12) United States Patent
Rible

(10) Patent No.: US 7,555,637 B2
(45) Date of Patent: Jun. 30, 2009

(54) MULTI-PORT READ/WRITE OPERATIONS BASED ON REGISTER BITS SET FOR INDICATING SELECT PORTS AND TRANSFER DIRECTIONS

(75) Inventor: John W. Rible, Santa Cruz, CA (US)

(73) Assignee: VNS Portfolio LLC, Cupertino, CA (US)

( * ) Notice: Subject to any disclaimer, the term of this patent is extended or adjusted under 35 U.S.C. 154(b) by 0 days.

(21) Appl. No.: 11/741,649

(22) Filed: Apr. 27, 2007

(65) Prior Publication Data
US 2008/0270648 A1 Oct. 30, 2008

(51) Int. Cl.
G06F 13/14 (2006.01)
(52) U.S. Cl. .................... 712/225; 710/12; 710/38; 712/10
(58) Field of Classification Search .................. None
See application file for complete search history.

(56) References Cited

U.S. PATENT DOCUMENTS

| 3,757,306 | A |   | 9/1973  | Boone ............... 340/172.5 |
| 4,107,773 | A |   | 8/1978  | Gilbreath et al. ......... 364/200 |
| 4,215,422 | A |   | 7/1980  | McCray et al. ........... 364/900 |
| 4,298,932 | A |   | 11/1981 | Sams ................... 364/200 |
| 4,462,074 | A |   | 7/1984  | Linde ................... 364/200 |
| 4,589,067 | A |   | 5/1986  | Porter et al. ............ 364/200 |
| 4,821,231 | A |   | 4/1989  | Cruess et al. ............ 364/900 |
| 4,984,151 | A |   | 1/1991  | Dujari .................. 364/200 |
| 5,029,124 | A | * | 7/1991  | Leahy et al. ............. 710/105 |
| 5,053,952 | A |   | 10/1991 | Koopman et al. ......... 364/200 |
| 5,218,682 | A |   | 6/1993  | Frantz .................. 395/325 |
| 5,317,735 | A |   | 5/1994  | Schomberg ............. 395/650 |
| 5,319,757 | A |   | 6/1994  | Moore et al. ............ 395/375 |

(Continued)

FOREIGN PATENT DOCUMENTS

DE 3937807 5/1990

(Continued)

OTHER PUBLICATIONS

*Ambric's New Parallel Processor; Globally Asynchronous Architecture Eases Parallel Programming*; Tom R. Halfhill; Microprocessor Report, Scottsdale, AZ; Oct. 10, 2006; pp. 1-9.

(Continued)

Primary Examiner—Kenneth S Kim
(74) Attorney, Agent, or Firm—Henneman & Associates, PLC; Larry E. Henneman, Jr.

(57) ABSTRACT

A computer (12) having multiple data paths (38*a-d*) connecting to other devices, which may be similar computers. A register (40*d*) is provided that has bits (110) programmatically settable to address each of the data paths such that the computer can communicate via multiple of the data paths based on which bits are concurrently set in the register. The bits respectively represent instances of the other devices as source devices that the computer can read data from and instances of the other devices as destination devices that the computer can write data to. A single address in the register can represent both a source device and a destination device for data communicated by the computer. Optionally, multiple of the computers can be connected in series (termed a pipeline) or to form an array (10).

17 Claims, 7 Drawing Sheets

U.S. PATENT DOCUMENTS

| | | | |
|---|---|---|---|
| 5,359,568 A | 10/1994 | Livay et al. | 365/221 |
| 5,375,238 A | 12/1994 | Ooi | 395/700 |
| 5,377,333 A | 12/1994 | Nakagoshi et al. | 395/325 |
| 5,390,304 A | 2/1995 | Leach et al. | 395/375 |
| 5,396,609 A | 3/1995 | Schmidt et al. | 395/425 |
| 5,410,723 A | 4/1995 | Schmidt et al. | 395/800 |
| 5,440,749 A | 8/1995 | Moore et al. | 395/800 |
| 5,485,624 A | 1/1996 | Steinmetz et al. | 395/775 |
| 5,535,393 A | 7/1996 | Reeve et al. | 395/700 |
| 5,535,417 A | 7/1996 | Baji et al. | 395/842 |
| 5,551,045 A | 8/1996 | Kawamoto et al. | 395/775 |
| 5,657,485 A | 8/1997 | Streitenberger et al. | 395/595 |
| 5,692,197 A | 11/1997 | Narad et al. | 395/750 |
| 5,706,491 A | 1/1998 | McMahan | 395/581 |
| 5,717,943 A | 2/1998 | Barker et al. | 395/800 |
| 5,727,194 A | 3/1998 | Shridhar et al. | 395/588 |
| 5,752,259 A | 5/1998 | Tran | 711/125 |
| 5,784,602 A | 7/1998 | Glass et al. | 395/561 |
| 5,826,101 A | 10/1998 | Beck et al. | 395/800.34 |
| 5,893,148 A | 4/1999 | Genduso et al. | 711/132 |
| 5,911,082 A | 6/1999 | Monroe et al. | 395/800.35 |
| 6,003,128 A | 12/1999 | Tran | 712/241 |
| 6,023,753 A | 2/2000 | Pechanek et al. | 712/18 |
| 6,038,655 A | 3/2000 | Little et al. | 712/32 |
| 6,085,304 A | 7/2000 | Morris et al. | 712/22 |
| 6,101,598 A | 8/2000 | Dokic et al. | 712/227 |
| 6,112,296 A | 8/2000 | Witt et al. | 712/222 |
| 6,145,072 A | 11/2000 | Shams et al. | 712/22 |
| 6,148,392 A | 11/2000 | Liu | 712/202 |
| 6,154,809 A | 11/2000 | Ikenaga et al. | 711/108 |
| 6,173,389 B1 | 1/2001 | Pechanek et al. | 712/24 |
| 6,178,525 B1 | 1/2001 | Warren | 714/37 |
| 6,219,685 B1 | 4/2001 | Story | 708/498 |
| 6,223,282 B1 | 4/2001 | Kang | 712/241 |
| 6,279,101 B1 | 8/2001 | Witt et al. | 712/215 |
| 6,353,880 B1 | 3/2002 | Cheng | 712/200 |
| 6,367,005 B1 | 4/2002 | Zahir et al. | 712/228 |
| 6,381,705 B1 | 4/2002 | Roche | 713/601 |
| 6,427,204 B1 | 7/2002 | Arimilli et al. | 712/206 |
| 6,449,709 B1 | 9/2002 | Gates | 712/202 |
| 6,460,128 B1 | 10/2002 | Baxter et al. | 712/11 |
| 6,507,649 B1 | 1/2003 | Tovander | 379/230 |
| 6,598,148 B1 | 7/2003 | Moore et al. | 712/32 |
| 6,665,793 B1 | 12/2003 | Zahir et al. | 712/228 |
| 6,725,361 B1 | 4/2004 | Rozas et al. | 712/222 |
| 6,825,843 B2 | 11/2004 | Allen et al. | 345/522 |
| 6,826,674 B1 | 11/2004 | Sato | 712/200 |
| 6,845,412 B1 * | 1/2005 | Boike et al. | 710/36 |
| 6,959,372 B1 | 10/2005 | Hobson et al. | 711/168 |
| 7,028,163 B2 | 4/2006 | Kim et al. | 712/202 |
| 7,079,046 B2 * | 7/2006 | Tanaka | 340/870.07 |
| 7,136,989 B2 | 11/2006 | Ishii | 712/23 |
| 7,155,602 B2 | 12/2006 | Poznanovic | 713/1 |
| 7,197,624 B2 | 3/2007 | Pechanek et al. | 712/11 |
| 7,269,805 B1 | 9/2007 | Ansari et al. | 716/4 |
| 2002/0010844 A1 | 1/2002 | Noel et al. | 711/153 |
| 2003/0028750 A1 | 2/2003 | Hogenauer | 712/10 |
| 2003/0217242 A1 | 11/2003 | Wybenga et al. | 711/163 |
| 2004/0003219 A1 | 1/2004 | Uehara | 712/241 |
| 2004/0059895 A1 | 3/2004 | May et al. | 712/223 |
| 2004/0107332 A1 | 6/2004 | Fujii et al. | 712/16 |
| 2004/0143638 A1 | 7/2004 | Beckmann et al. | 709/212 |
| 2005/0114565 A1 | 5/2005 | Gonzalez et al. | 710/36 |
| 2005/0149693 A1 | 7/2005 | Barry | 712/34 |
| 2005/0223204 A1 | 10/2005 | Kato | 712/241 |
| 2006/0101238 A1 | 5/2006 | Bose et al. | 712/206 |
| 2006/0149925 A1 | 7/2006 | Nguyen et al. | 712/23 |
| 2006/0248317 A1 | 11/2006 | Vorbach et al. | 712/221 |
| 2007/0113058 A1 | 5/2007 | Tran et al. | 712/241 |

FOREIGN PATENT DOCUMENTS

| | | |
|---|---|---|
| EP | 0156654 | 10/1985 |
| EP | 0227319 | 7/1987 |
| EP | 0992896 | 4/2000 |
| EP | 1182544 | 2/2002 |
| EP | 1821211 | 2/2007 |
| WO | WO97/15001 | 4/1997 |
| WO | WO00/42506 | 7/2000 |
| WO | WO02/50700 | 6/2002 |
| WO | WO02/88936 | 11/2002 |
| WO | WO03/019356 | 3/2003 |
| WO | WO2005/091847 | 10/2005 |

OTHER PUBLICATIONS

*An Asynchronous Array of Simple Processors for DSP Applications*; Zhiyi et al., Yu; IEEE International Conference Digest of Technical Papers, Feb. 6-9, 2006; pp. 1696-1705.

*An Improved Dynamic Register Array Concept for High-Performance RISC Processors*; Scholz, T. et al.; IEEE; 1995; pp. 181-190.

*An Instruction Buffer for Low-Power DSP*; Brackenbury, M. L. L.; Advanced Research In Asynchronous Circuits And Systems, 2000 (ASYNC 2000) Proceedings, Sixth international Symposium On Eilat, Israel, Apr. 2-6, 2000; Los Alamitos, CA, USA; IEEE Comput. Soc., US; Apr. 2, 2000, pp. 176-186.

*An Ultra Low-Power Processor for Sensor Networks*; Ekanayake et al., V.; Sigplan Notices ACM, vol. 39, No. 11, Nov. 2004; pp. 27-36.

*ASPRO-216: A Standard-Cell Q.D.I. 16-Bit RISC Asynchronous Microprocessor*; Renaudin et al.; Proceedings. International Symposium On Advanced Research In Asynchronous Circuits And Systems; Jan. 1, 1989, p. 2231.

*BitSNAP: Dynamic Significance Compression for a Low-Energy Sensor Network Asynchronous Processor*; Ekanayake et al., V.N.; Asynchronous Circuits & Systems, Mar. 14-16, 2005; pp. 144-154.

*B16—Ein Forth Prozessor im FPGA*; Bernd Paysan; INET (Online); Feb. 2, 2003, XP002490986; Retrieved from the Internet: url:http://www.jwdt.com/{paysan/b16.pdf> p. 1.

*C18 Colorforth Compiler*; Chuck Moore; Euroforth 2001 (Online); Nov. 26, 2001, XP002490985, Schloss Dagstuhl, Saarland, Germany; Retrieved from the Internet: url:http://www.complang.tuwien.ac.at/anton/euroforth/ef01/moore01a.pdf> p. 1.

*Computer Architecture: a Quantitative Approach*; Hennessy et al., John L.; Morgan Kaufmann Publishers, 3$^{rd}$ Edition, 2003; p. 98.

*Connection Machine Model CM-5 System Overview*; Palmer et al., Thinking Machine Corp., Cambridge, Mass., IEEE Jul. 1992, pp. 474-483.

*Datawave: A Single-Chip Multiprocessor for Video Applications*; Schmidt et al., U.; IEEE Micro, IEEE Service Center, vol. 11, No. 3, Jun. 1, 1991; pp. 22-25, 88.

*Energy Characterization of a Tiled Architecture Processor with On-Chip Networks*; Kim, J.S.; Proceedings of the 2003 International Symposium on Low Power Electronics & Design, Aug. 25-27, 2003; pp. 424-427.

*Enhanced Serial Port on the 83C51FA*, Intel, Nov. 1987, AP-410.

*Flits: Pervasive Computing for Processor and Memory Constrained Systems*, Majurski et al., NIST, pp. 31-38; Aug. 21, 2000.

*Forth Session—The Evolution of Forth*, Rather et al., Sigplan Notices USA, vol. 28, No. 3, Mar. 1993, pp. 177-199.

*Functionally Asynchronous Array Processor for Morphological Filtering of Greyscale Images*; Robin et al., F.; IEEE Proceedings: Computers and Digital Techniques, vol. 143, No. 5, Sep. 24, 1996; pp. 273-281.

*IEEE Standard for Boot (Initialization Configuration) Firmware: Core Requirements and Practices*, IEEE Std 1275; 1994.

*Introduction to Java's Architecture*, Bill Venners, Artima.com; Jan. 8, 1999, pp. 1-10.

*Itanium Processor Microarchitecture*; Sharangpani, H. et al.; IEEE; 2000; pp. 24-43.

*iWarp: A 100-MPOS, LIW Microprocessor for Multicomputers*; Peterson et al.; IEEE Micro; IEEE Service Center, Los Alamitos, CA; vol. 11, No. 3, Jun. 1, 1991, pp. 26-29, 81-87.

*Low-Power Electronics Design*; Piguet, Christian; CRC Press, 2005, pp. 7-1-7-18.

*M68HC11 Microcontrollers Reference Manual*, Motorola, Rev.6, Apr. 2002, p. 29-31, 46, 203, 234, 549.

*Mikroprozessortechnik—pp. 528-533*; Flik, T.; 2001, Springer Verlag, Berlin; ISBN: 3-540-42042-8; p. 528; figures 8-5a, (in German).

*Performance and Power Analysis of Globally Asynchronous Locally Synchronous Multi-Processor Systems*, Zhiyi Yu et al., Emerging VLSI Technologies And Architectures, 2006. IEEE Computer Society Annual Symposium On Klarlsruhe, Germany, Mar. 2-3, 2006, Piscataway, NJ, USA, IEEE, Mar. 2, 2006 pp. 378-383.

*Stack Computers: The New Wave*; Koopman, Jr.; Philip; Mountain View Press, La Honda, CA; 1989; pp. 1-232.

*Teilzeitarbeit im Prozessor*; Frees, W.; Electronik, WEKA Fachzeitschriftenverlag, Poing, DE, vol. 45, No. 9, Apr. 30, 1996; pp. 100-106, (in German).

*The Architecture of the SC32 Forth Engine*; Hayes et al.; Journal of Forth Application And Research, Institute For Applied Forth Research; Rochester, US; vol. 5, No. 4, 1989, pp. 493-506 (pp. 500-501 Fig 3).

*The Computer Engineering Handbook*; Oklobdzija, Vojin G.; CRC Press, 2002; Chapter 7: Architectures for Low Power.

*The PASM Project: A Study of Reconfigurable Parallel Computing*; Siegel et al., H.J.; Parallel Architectures, Algorithms and Networks, Jun. 12-14, 1996; pp. 529-536.

*The Raw Microprocessor: A Computational Fabric For Software Circuits And General-Purpose Programs*; Agarwal et al.; IEEE Micro; IEEE, Service Center, Los Alamitos, CA; vol. 22, No. 2, Mar. 1, 2002, pp. 25-35.

*Use IRAM For Rasterization*, Kang Y et al., Image Processing, 1998, ICIP 98. Proceedings. 1998; International Conference on Chicago, IL, USA. Oct. 4-7, 1998, Los Alamitos, CA, USA, IEEE Comput. Soc. US, vol. 3,Oct. 4, 1998, pp. 1010-1013.

*VBScript Looping Statements*; W3Schools; www.w3schools.com/vbscript/vbsript_looping.asp; Jul. 2000.

XP-002488692 (*2.1.3 Adressierungsarten und Befehlsformate*); Flik, T.; 2 Der Mikroprozessortechnik; 2001, Springer, Berlin; ISBN: 3-540-42042-8; pp. 76-84, (in German).

*8Xc251SB Embedded Microcontroller User's Manual*, Intel, Feb. 1995, pp. 1-9, 9-438, and sections 9-1 to 9-4.

*25x Emulator*; Chuck Moore; Euroforth 2001 (Online); Nov. 26, 2001, XP002490984, Schloss Dagstuhl, Saarland, Germany; Retreived from the Internet: p. 2, para 8, url:http://www.complang.tuwien.ac.at/anton/euroforth/ef01/moore01b.pdf>.

\* cited by examiner

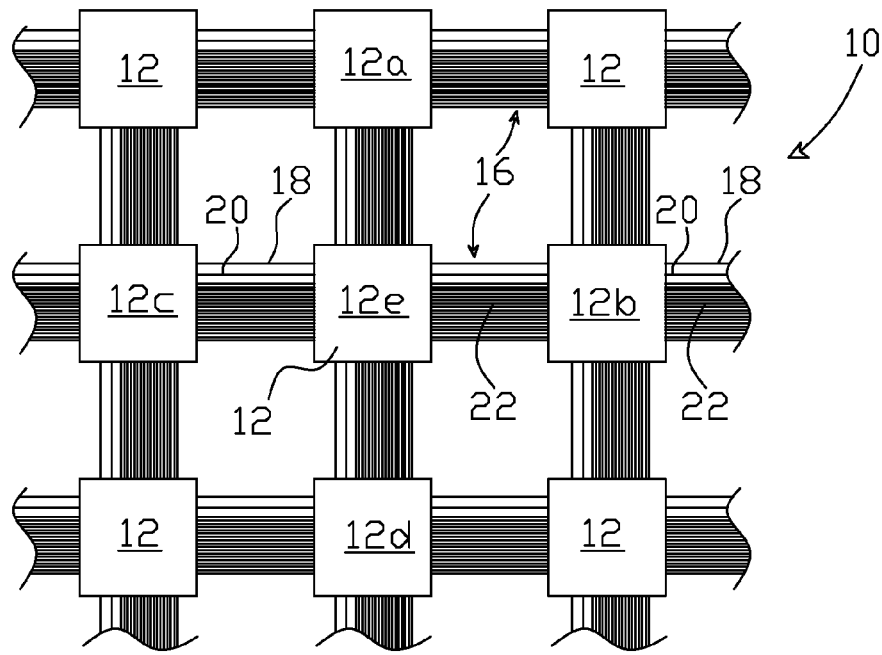
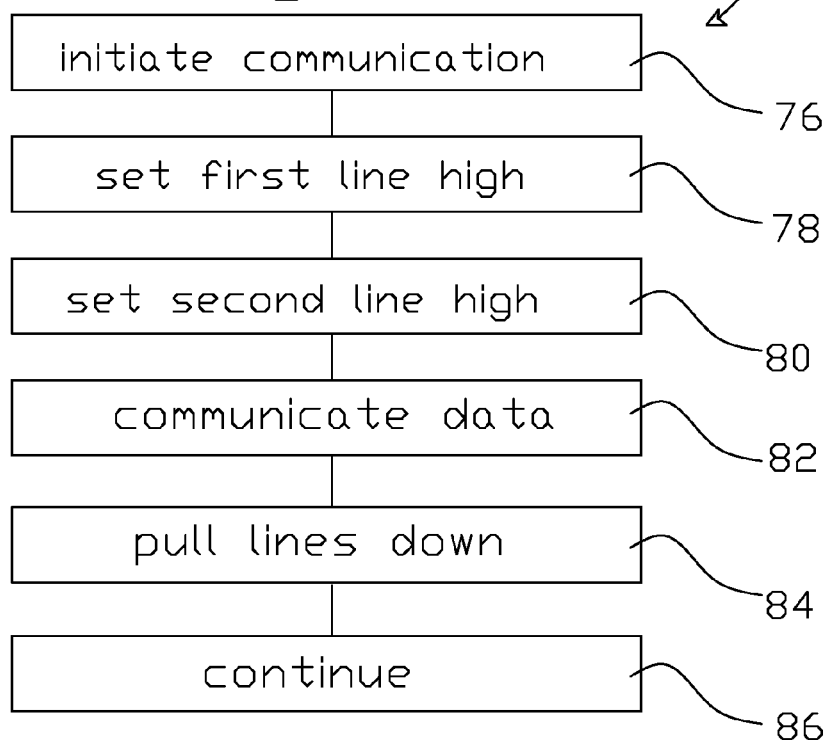

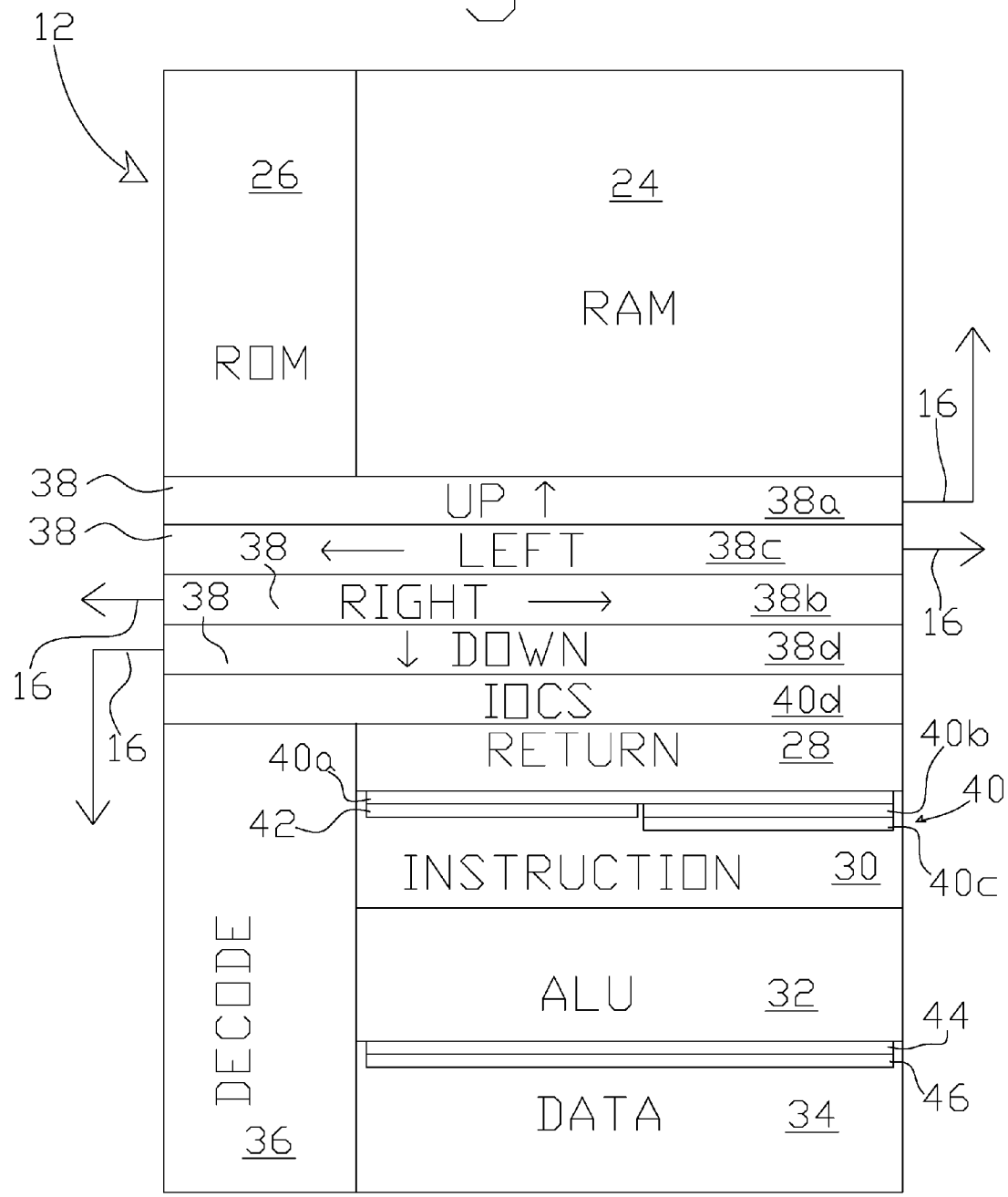

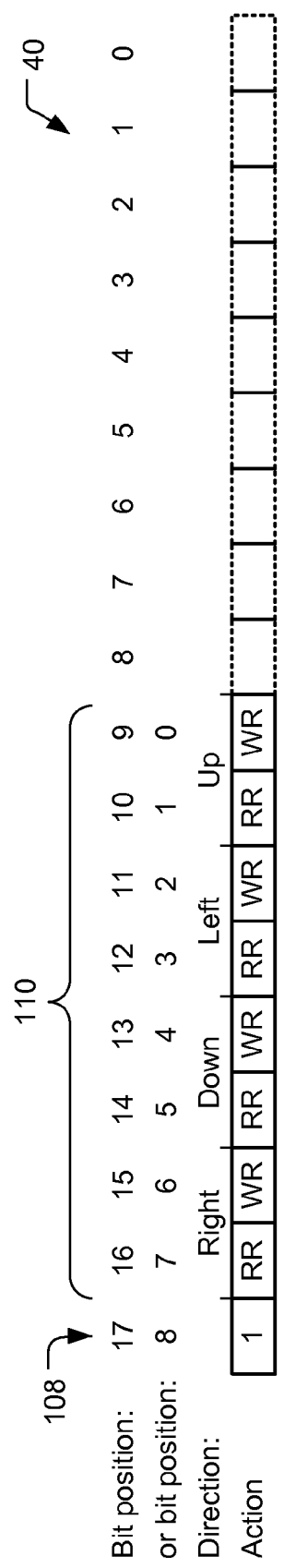
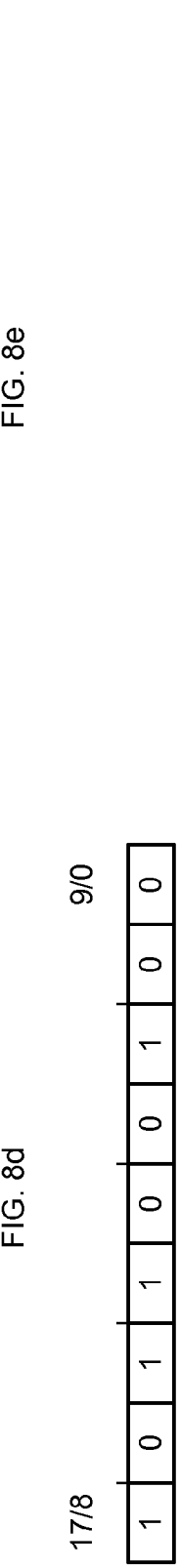
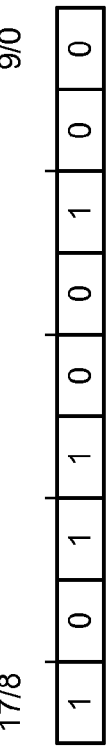

MULTI-PORT READ/WRITE OPERATIONS BASED ON REGISTER BITS SET FOR INDICATING SELECT PORTS AND TRANSFER DIRECTIONS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Technical Field

The present invention relates generally to electrical computers and digital processing systems having processing architectures and performing instruction processing, and more particularly to such for processing instruction data that specifically supports or performs a data transfer operation.

2. Background Art

In the art of computing, processing speed is a much desired quality, and the quest to create faster computers and processors is ongoing. However, it is generally acknowledged in the industry that the limits for increasing the speed in microprocessors are rapidly being approached, at least using presently known technology. Therefore, there is an increasing interest in the use of multiple processors to increase overall computer speed by sharing computer tasks among the processors. But it is also generally acknowledged that there will, almost inevitably, be some decrease in overall efficiency involved in the sharing of the workload. That is, the old adage will apply that just because one person can dig a post hole in 60 minutes, it does necessarily follow that 60 people could dig a post hole in 1 minute. The same principle applies to almost any division of tasks, and the division of tasks among processors is no exception.

Of course, efforts are being made to make the sharing of tasks among computer processors more efficient. The question of exactly how the tasks are to be allocated is being examined and processes improved. In the course of work in this area it has been the present inventors' observation that it may be very cumbersome under some circumstances to transfer data from one CPU to another in a multi-CPU environment. For example, if data must be transferred from one CPU to another, and the target CPU is separated from the source CPU by one CPU between them, the source CPU must write the data to the CPU directly in line, which must then in turn read the data and then write it to the target CPU, which must then read the data. Such a process requires many read and write operations, and if a large quantity of data is being transferred, so many read and write commands may clog system operations.

BRIEF SUMMARY OF THE INVENTION

Accordingly, it is an object of the present invention to provide systems and methods for multi-port read and write operations.

Briefly, one preferred embodiment of the present invention is a computer having multiple data paths connecting the computer to other devices, which are typically but not necessarily other computers. A register in the computer has bits programmed to address each of the data paths, so the computer can communicate via multiple of the data paths based on which of the bits are concurrently set.

Briefly, another preferred embodiment of the present invention is a process for a computer to communicate data. Multiple data paths connecting the computer to other devices are monitored for a signal that another device is seeking to write the data to the computer. The data from the first such other device is then read. And the data is written to yet another device based on a register having bits programmed to address the multiple data paths.

An advantage of the present invention is that it increases the speed of data transfer among multiple processors, particularly when the processors are arranged as a multidimensional array and have more than two paths per processor by which data can be read or written.

Another advantage of the invention is that it facilitates the use of multiple processors to increase overall computing speed by sharing tasks among the processors.

Another advantage of the invention is that it is particularly suitable for use by processors that communicate asynchronously.

And another advantage of the invention is that it reduces the overhead when sharing tasks among multiple processors.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which:

FIG. 2 is a detailed diagram showing a subset of the computers of FIG. 1 and a more detailed view of the interconnecting data buses of FIG. 1;

FIG. 3 is a block diagram depicting a general layout of one of the computers of FIGS. 1 and 2;

FIG. 6 is a flow diagram depicting an example of a method in accord with the present invention;

Figure 7:
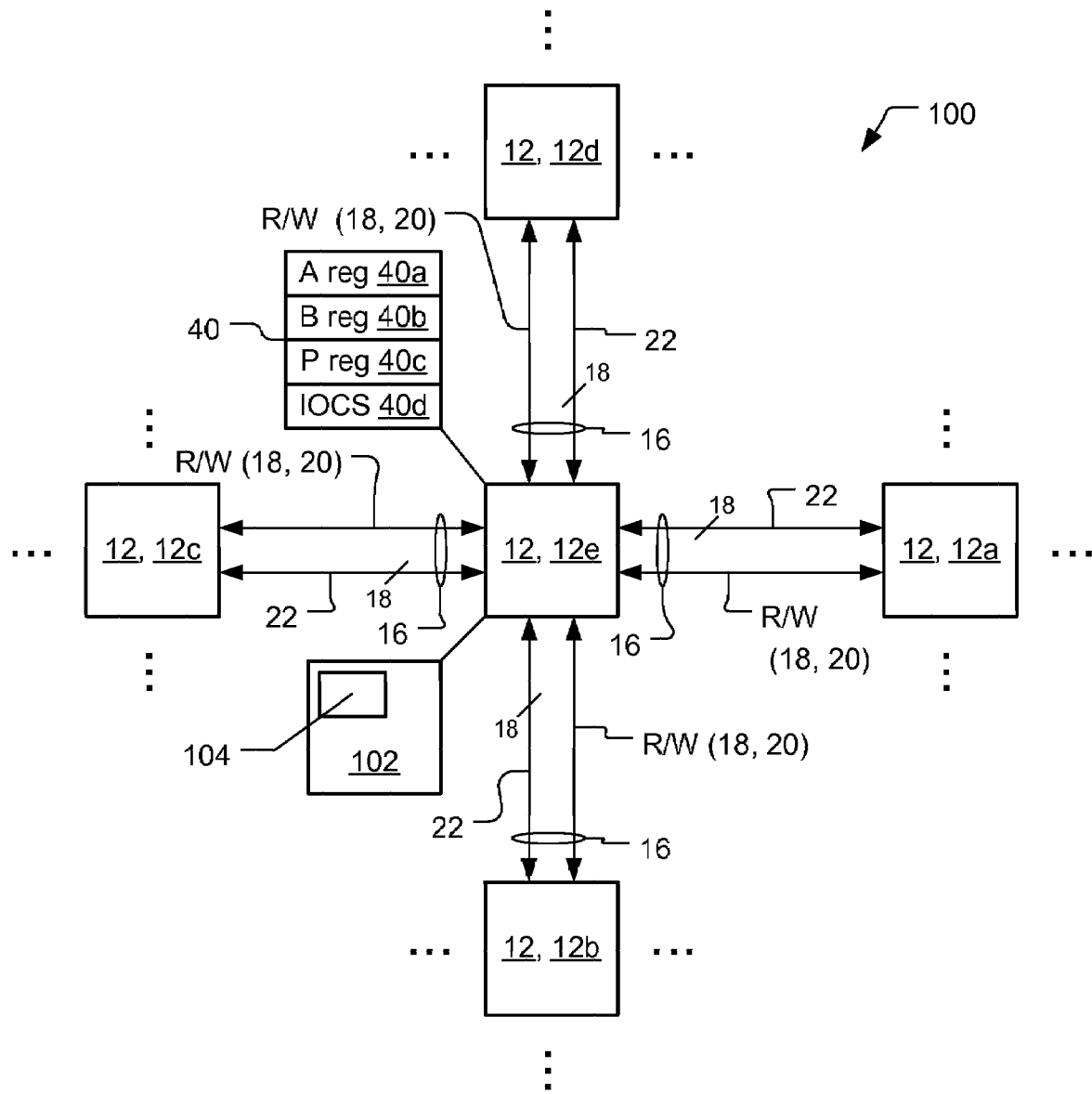
FIG. 7 is a detailed diagram showing a section of the computer array in FIGS. 1 and 2 used to discuss an exemplary embodiment that is in accord with the present invention.
Figure 9:
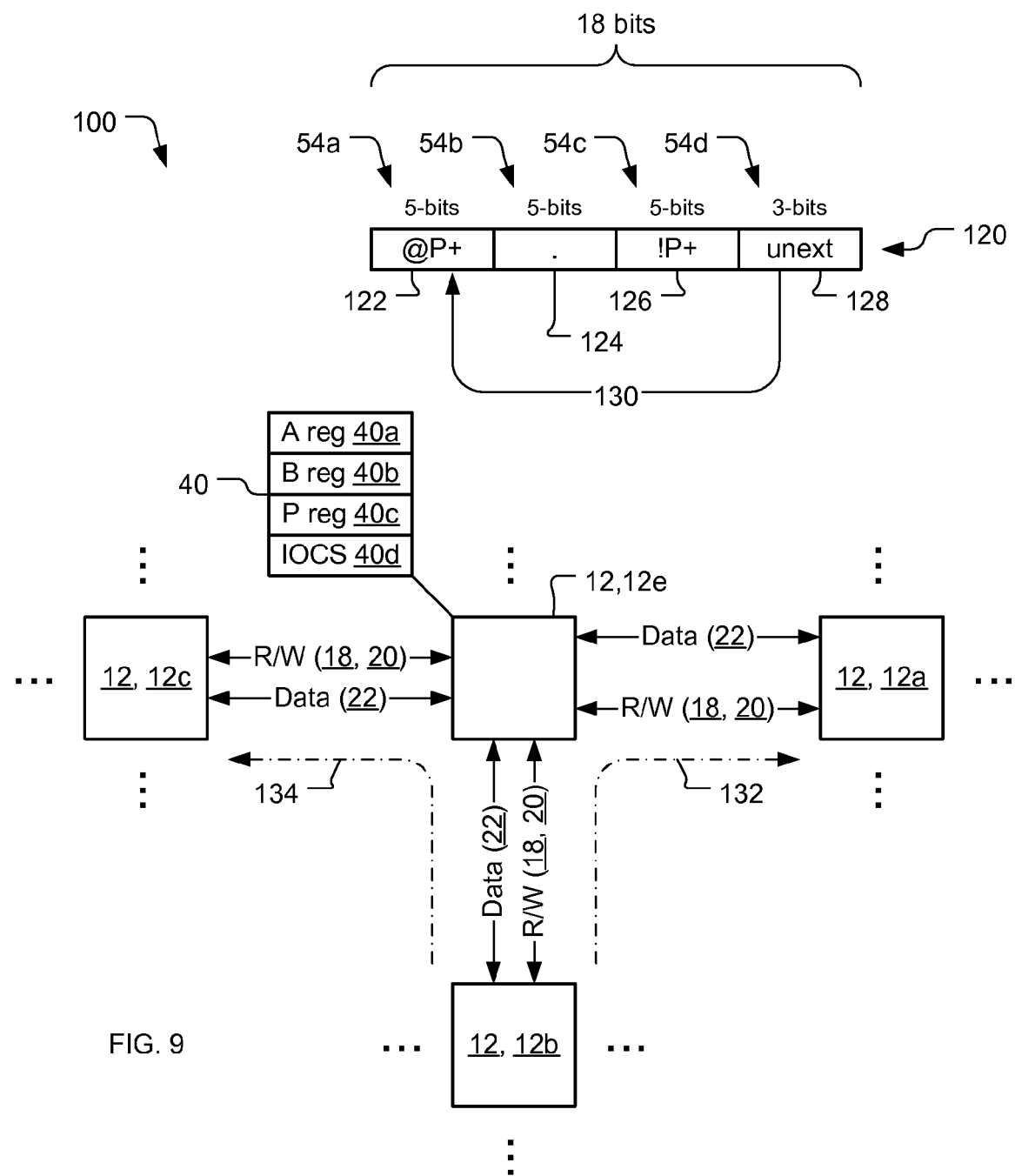

FIG. 8a-f are table diagrams showing an overview of port address decoding that is usable in the computers in the section in FIG. 7; and FIG. 9 is a schematic block diagram depicting how the multiple-write approach illustrated in FIG. 7 and FIG. 8d-f can particularly be combined with an ability to include multiple instructions in a single instruction word.

In the various figures of the drawings, like references are used to denote like or similar elements or steps.

DETAILED DESCRIPTION OF THE INVENTION

While this invention is described in terms of modes for achieving this invention's objectives, it will be appreciated by those skilled in the art that variations may be accomplished in view of these teachings without deviating from the spirit or scope of the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Preferred embodiments of the present invention are systems and methods for multi-port read and write operations. As illustrated in the various drawings herein, and particularly in the view of FIG. 7, preferred embodiments of the invention are depicted by the general reference character 100.

As context and a foundation to the present invention, a detailed example of asynchronous computer communication is first presented. For this, a computer array is depicted in a diagrammatic view in FIG. 1 and is designated therein by the general reference character 10. The computer array 10 has a plurality (twenty four in the example shown) of computers 12 (sometimes also referred to as "cores" or "nodes" in the example of an array). In the example shown, all of the computers 12 are located on a single die 14. Each of the computers 12 is a generally independently functioning computer, as will be discussed in more detail hereinafter. The computers 12 are interconnected by a plurality of interconnecting data buses 16 (the quantities of which will be discussed in more detail hereinafter). In this example, the data buses 16 are bidirectional asynchronous high speed parallel data buses, although it is within the scope of the invention that other interconnecting means might be employed for the purpose. In the present embodiment of the array 10, not only is data communication between the computers 12 asynchronous, the individual computers 12 also operate in an internally asynchronous mode. This has been found to provide important advantages. For example, since a clock signal does not have to be distributed throughout the computer array 10, a great deal of power is saved. Furthermore, not having to distribute a clock signal eliminates many timing problems that could limit the size of the array 10 or cause other difficulties.

Figure 1:
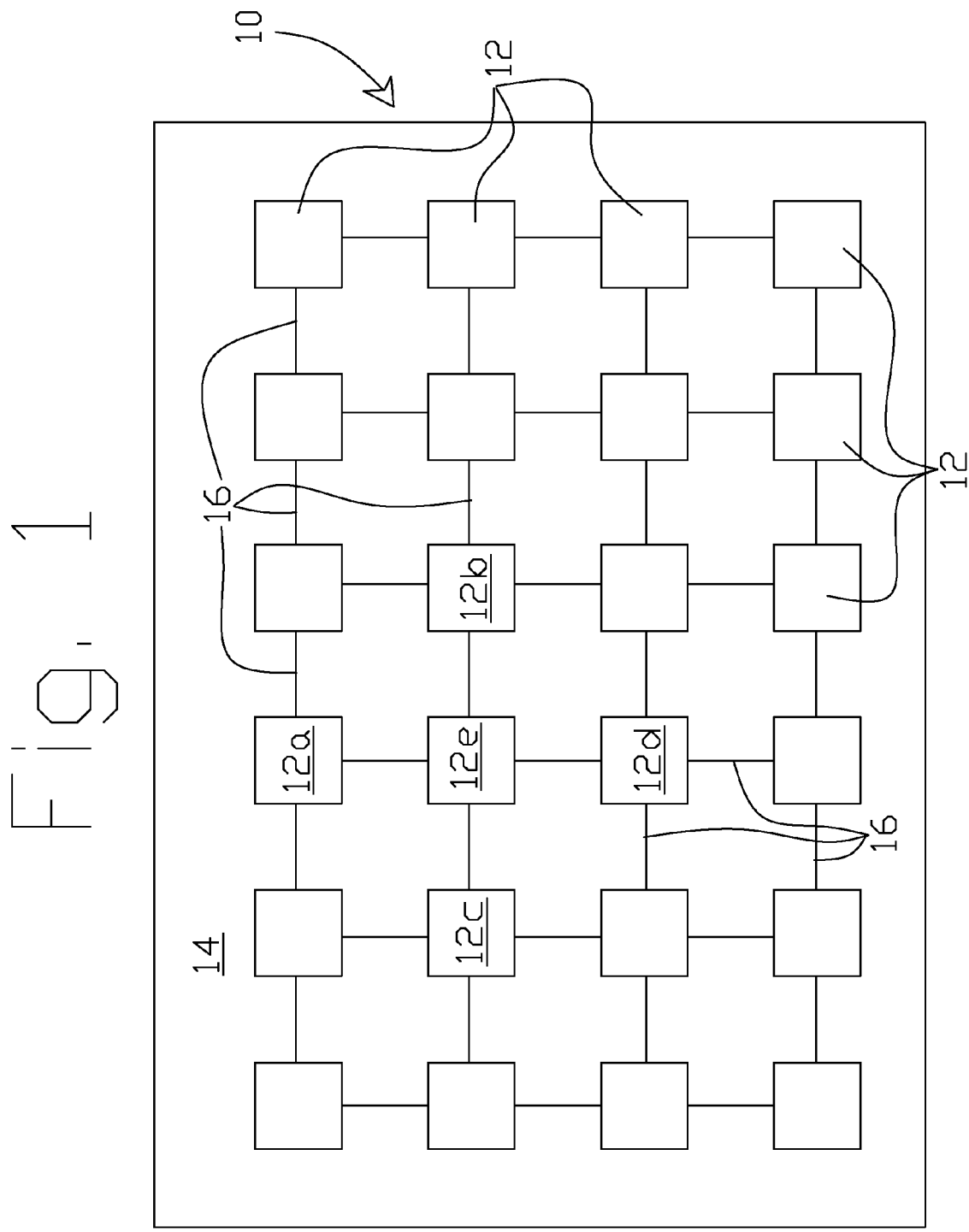
FIG. 1 is a diagrammatic view of a computer array in accord with the present invention.

One skilled in the art will recognize that there will be additional components on the die 14 that are omitted from the view of FIG. 1 for the sake of clarity. Such additional components include power buses, external connection pads, and other such common aspects of a microprocessor chip.

Computer 12e is an example of one of the computers 12 that is not on the periphery of the array 10. That is, computer 12e has four orthogonally adjacent computers 12a, 12b, 12c and 12d. This grouping of computers 12a through 12e will be used hereinafter in relation to a more detailed discussion of the communications between the computers 12 of the array 10. As can be seen in the view of FIG. 1, interior computers such as computer 12e will have four other computers 12 with which they can directly communicate via the buses 16. In the following discussion, the principles discussed will apply to all of the computers 12 except that the computers 12 on the periphery of the array 10 will be in direct communication with only three or, in the case of the corner computers 12, only two other of the computers 12.

FIG. 2 is a more detailed view of a portion of FIG. 1 showing only some of the computers 12 and, in particular, computers 12a through 12e, inclusive. The view of FIG. 2 also reveals that the data buses 16 each have a read line 18, a write line 20 and a plurality (eighteen, in this example) of data lines 22. The data lines 22 are capable of transferring all the bits of one eighteen-bit instruction word generally simultaneously in parallel. It should be noted that, in an alternate embodiment, some of the computers 12 are mirror images of adjacent computers. However, whether the computers 12 are all oriented identically or as mirror images of adjacent computers is not important here, and this potential complication will not be discussed further herein.

A computer 12, such as the computer 12e can set one, two, three or all four of its read lines 18 such that it is prepared to receive data from the respective one, two, three or all four adjacent computers 12. Similarly, it is also possible for a computer 12 to set one, two, three or all four of its write lines 20 high. (Both cases are discussed in more detail hereinafter.)

When one of the adjacent computers 12a, 12b, 12c or 12d sets a write line 20 between itself and the computer 12e high, if the computer 12e has already set the corresponding read line 18 high, then a word is transferred from that computer 12a, 12b, 12c or 12d to the computer 12e on the associated data lines 22. Then the sending computer 12 will release the write line 20 and the receiving computer 12e (in this example) pulls both the write line 20 and the read line 18 low. The latter action will acknowledge to the sending computer 12 that the data has been received. Note that the above description is not intended necessarily to denote the sequence of events in order. In actual practice, the receiving computer may try to set the write line 20 low slightly before the sending computer 12 releases (stops pulling high) its write line 20. In such an instance, as soon as the sending computer 12 releases its write line 20 the write line 20 will be pulled low by the receiving computer 12e.

In the present example, only a programming error would cause both computers 12 on the opposite ends of one of the buses 16 to try to set either both of the read lines 18 there-between high or to set both of the write lines 20 there-between high at the same time. However, it is presently anticipated that there will be occasions wherein it is desirable to set different combinations of the read lines 18 high such that one of the computers 12 can be in a wait state awaiting data from the first one of the chosen computers 12 to set its corresponding write line 20 high.

In the example discussed above, computer 12e was described as setting one or more of its read lines 18 high before an adjacent computer (selected from one or more of the computers 12a, 12b, 12c or 12d) has set its write line 20 high. However, this process can certainly occur in the opposite order. For example, if the computer 12e were attempting to write to the computer 12a, then computer 12e would set the write line 20 between computer 12e and computer 12a to high. If the read line 18 between computer 12e and computer 12a has then not already been set to high by computer 12a, then computer 12e will simply wait until computer 12a does set that read line 18 high. Then, as discussed above, when both of a corresponding pair of read line 18 and write line 20 are high the data awaiting to be transferred on the data lines 22 is transferred. Thereafter, the receiving computer 12a (in this example) sets both the read line 18 and the write line 20 between the two computers 12e and 12a (in this example) to low as soon as the sending computer 12e releases it.

Whenever a computer 12 such as the computer 12e has set one of its write lines 20 high in anticipation of writing it will simply wait, using essentially no power, until the data is "requested," as described above, from the appropriate adjacent computer 12, unless the computer 12 to which the data is to be sent has already set its read line 18 high, in which case the data is transmitted immediately. Similarly, whenever a computer 12 has set one or more of its read lines 18 to high in anticipation of reading it will simply wait, using essentially no power, until the write line 20 connected to a selected computer 12 goes high to transfer an instruction word between the two computers 12.

There may be several potential means and/or methods to cause the computers 12 to function as described above. However, in this present example, the computers 12 so behave simply because they are operating generally asynchronously internally (in addition to transferring data there-between in the asynchronous manner described). That is, instructions are completed sequentially. When either a write or read instruction occurs, there can be no further action until that instruction is completed (or, perhaps alternatively, until it is aborted, as by a "reset" or the like). There is no regular clock pulse, in the prior art sense. Rather, a pulse is generated to accomplish a next instruction only when the instruction being executed either is not a read or write type instruction (given that a read or write type instruction would require completion by another entity) or else when the read or write type operation is, in fact, completed.

FIG. 3 is a block diagram depicting the general layout of an example of one of the computers 12 of FIGS. 1 and 2. As can be seen in the view of FIG. 3, each of the computers 12 is a generally self contained computer having its own RAM 24 and ROM 26. As mentioned previously, the computers 12 are also sometimes referred to as individual "cores," given that they are, in the present example, combined on a single chip.

Other basic components of the computer 12 are a return stack 28, an instruction area 30, an arithmetic logic unit (ALU 32), a data stack 34, and a decode logic section 36 for decoding instructions. One skilled in the art will be generally familiar with the operation of stack based computers such as the computers 12 of this present example. The computers 12 are dual stack computers having the data stack 34 and separate return stack 28.

In this embodiment of the invention, the computer 12 has four communication ports 38 for communicating with adjacent computers 12. The communication ports 38 are tri-state drivers, having an off status, a receive status (for driving signals into the computer 12) and a send status (for driving signals out of the computer 12). Of course, if the particular computer 12 is not on the interior of the array (FIG. 1) such as the example of computer 12e, then one or more of the communication ports will not be used in that particular computer, at least for the purposes described herein. The instruction area 30 includes a number of registers 40, which in this example are an A register 40a, a B register 40b, a P register 40c, and an I/O control and status register (IOCS register 40d). In this example, the A register 40a and the IOCS register 40d are full eighteen-bit registers, while the B register 40b and the P register 40c are nine-bit registers.

Although the invention is not limited by this example, the present computer 12 is implemented to execute native Forth language instructions. As one familiar with the Forth computer language will appreciate, complicated Forth instructions, known as Forth "words" are constructed from the native processor instructions designed into the computer. The collection of Forth words is known as a "dictionary." In other languages, this might be known as a "library." As will be described in greater detail hereinafter, the computer 12 reads eighteen bits at a time from RAM 24, ROM 26, or directly from one of the data buses 16 (FIG. 2). However, since most instructions in Forth (known as operand-less instructions) obtain their operands directly from the stacks 28 and 34, they are generally only five bits in length such that up to four instructions can be included in a single eighteen-bit instruction word, with the condition that the last instruction in the group is selected from a limited set of instructions that require only three bits. In this embodiment of the invention, the top two registers in the data stack 34 are a T register 44 and an S register 46. Also depicted in block diagrammatic form in the view of FIG. 3 is a slot sequencer 42 (discussed in detail presently).

Figure 4:
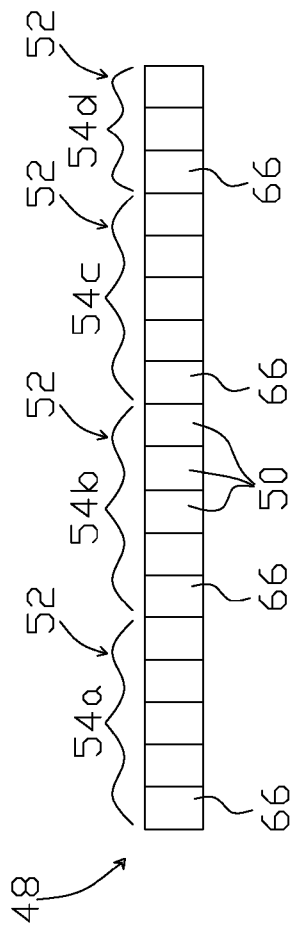
FIG. 4 is a diagrammatic representation of an instruction word that is usable in the computers of FIGS. 1 and 2.

FIG. 4 is a diagrammatic representation of an instruction word 48. (It should be noted that the instruction word 48 can actually contain instructions, data, or some combination thereof.) The instruction word 48 consists of eighteen bits 50. This being a binary computer, each of the bits 50 will be a '1' or a '0.' As previously discussed herein, the eighteen-bit wide instruction word 48 can contain up to four instructions 52 in four slots 54 called slot zero 54a, slot one 54b, slot two 54c, and slot three 54d. In the present embodiment, the eighteen-bit instruction words 48 are always read as a whole. Therefore, since there is always a potential of having up to four instructions in the instruction word 48, a no-op (no operation) instruction is included in the instruction set of the computer 12 to provide for instances when using all of the available slots 54 might be unnecessary or even undesirable. It should be noted that, according to one particular embodiment, the polarity (active high as compared to active low) of bits 50 in alternate slots (specifically, slots one 54b and three 54c) is reversed. However, this is not necessary and, therefore, in order to better explain this invention this potential complication is also avoided in the following discussion.

Figure 5:
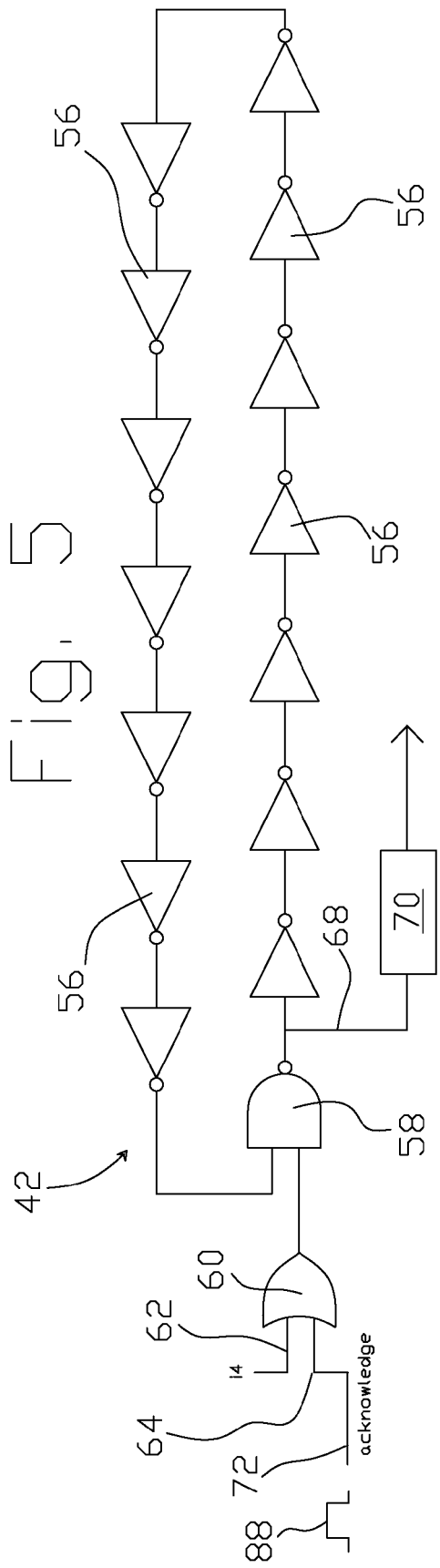
FIG. 5 is a schematic representation of the slot sequencer of FIG. 3.

FIG. 5 is a schematic representation of the slot sequencer 42 of FIG. 3. As can be seen in the view of FIG. 5, the slot sequencer 42 has a plurality (fourteen in this example) of inverters 56 and one NAND gate 58 arranged in a ring, such that a signal is inverted an odd number of times as it travels through the fourteen inverters 56 and the NAND gate 58. A signal is initiated in the slot sequencer 42 when either of the two inputs to an OR gate 60 goes high. A first OR gate input 62 is derived from an i4 bit 66 (FIG. 4) of the instruction 52 being executed. If i4 bit 66 is high then that particular instruction 52 is an ALU instruction, and the i4 bit 66 is '1'. When the i4 bit 66 is '1', then the first OR gate input 62 is high, and the slot sequencer 42 is triggered to initiate a pulse that will cause the execution of the next instruction 52.

When the slot sequencer 42 is triggered, either by the first OR gate input 62 going high or by the second OR gate input 64 going high (as will be discussed hereinafter), then a signal will travel around the slot sequencer 42 twice, producing an output at a slot sequencer output 68 each time. The first time the signal passes the slot sequencer output 68 it will be low, and the second time the output at the slot sequencer output 68 will be high. The relatively wide output from the slot sequencer output 68 is provided to a pulse generator 70 (shown in block diagrammatic form) that produces a narrow timing pulse as an output. One skilled in the art will recognize that the narrow timing pulse is desirable to accurately initiate the operations of the computer 12.

When the particular instruction 52 being executed is a read or a write instruction, or any other instruction wherein it is not desired that the instruction 52 being executed triggers immediate execution of the next instruction 52 in sequence, then the i4 bit 66 is '0' (low) and the first OR gate input 62 is, therefore, also low. One skilled in the art will recognize that the timing of events in a device such as the computers 12 is generally quite critical, and this is no exception. Upon examination of the slot sequencer 42 one skilled in the art will recognize that the output from the OR gate 60 must remain high until after the signal has circulated past the NAND gate 58 in order to initiate the second "lap" of the ring. Thereafter, the output from the OR gate 60 will go low during that second "lap" in order to prevent unwanted continued oscillation of the circuit.

As can be appreciated in light of the above discussion, when the i4 bit 66 is '0,' then the slot sequencer 42 will not be triggered—assuming that the second OR gate input 64, which will be discussed hereinafter, is not high.

As discussed, above, the i4 bit 66 of each instruction 52 is set according to whether or not that instruction is a read or write type of instruction. The remaining bits 50 in the instruction 52 provide the remainder of the particular opcode for that instruction. In the case of a read or write type instruction, one or more of the bits may be used to indicate where data is to be read from or written to in that particular computer 12. In the present example, data to be written always comes from the T register 44 (the top of the data stack 34), however data can be selectively read into either the T register 44 or else the instruction area 30 from where it can be executed. That is because, in this particular embodiment, either data or instructions can be communicated in the manner described herein and instructions can, therefore, be executed directly from the data bus 16, although this is not necessary. Furthermore, one or more of the bits 50 will be used to indicate which of the ports 38, if any, is to be set to read or write. This later operation is optionally accomplished by using one or more bits to designate a register 40, such as the A register 40a, the B register 40b, or the like. In such an example, the designated register 40 will be preloaded with data having a bit corresponding to each of the ports 38 (and, also, any other potential entity with which the computer 12 may be attempting to communicate, such as memory, an external communications port, or the like.) For example, each of four bits in the particular register 40 can correspond to each of the up port 38a, the right port 38b, the left port 38c, or the down port 38d. In such case, where there is a '1' at any of those bit locations, communication will be set to proceed through the corresponding port 38.

The immediately following example will assume a communication wherein computer 12e is attempting to write to computer 12c, although the example is applicable to communication between any adjacent computers 12. When a write instruction is executed in a writing computer 12e, the selected write line 20 is set high (in this example, the write line 20 between computers 12e and 12c). If the corresponding read line 18 is already high, then data is immediately sent from the selected location through the selected communications port 38. Alternatively, if the corresponding read line 18 is not already high, then computer 12e will simply stop operation until the corresponding read line 18 does go high. The mechanism for stopping (or, more accurately, not enabling further operations of) the computer 12a when there is a read or write type instruction has been discussed previously herein. In short, the opcode of the instruction 52 will have a '0' at the i4 bit 66 position, and so the first OR gate input 62 of the OR gate 60 is low, and so the slot sequencer 42 is not triggered to generate an enabling pulse.

As for how the operation of the computer 12e is resumed when a read or write type instruction is completed, the mechanism for that is as follows: When both the read line 18 and the corresponding write line 20 between computers 12e and 12c are high, then both lines 18 and 20 will be released by each of the respective computers 12 that is holding it high. (In this example, the sending computer 12e will be holding the write line 20 high while the receiving computer 12c will be holding the read line 18 high). Then the receiving computer 12c will pull both lines 18 and 20 low. In actual practice, the receiving computer 12c may attempt to pull the lines 18 and 20 low before the sending computer 12e has released the write line 20. However, since the lines 18 and 20 are pulled high and only weakly held (latched) low, any attempt to pull a line 18 or 20 low will not actually succeed until that line 18 or 20 is released by the computer 12 that is latching it high.

When both lines 18 and 20 in a data bus 16 are pulled low, this is an "acknowledge" condition. Each of the computers 12e and 12c will, upon the acknowledge condition, set its own internal acknowledge line 72 high. As can be seen in the view of FIG. 5, the acknowledge line 72 provides the second OR gate input 64. Since an input to either of the OR gate 60 inputs 62 or 64 will cause the output of the OR gate 60 to go high, this will initiate operation of the slot sequencer 42 in the manner previously described herein, such that the instruction 52 in the next slot 54 of the instruction word 48 will be executed. The acknowledge line 72 stays high until the next instruction 52 is decoded, in order to prevent spurious addresses from reaching the address bus.

In any case when the instruction 52 being executed is in the slot three position of the instruction word 48, the computer 12 will fetch the next awaiting eighteen-bit instruction word 48 unless, of course, the i4 bit 66 is a '0.' In actual practice, a method and apparatus for "prefetching" instructions can be included such that the fetch can begin before the end of the execution of all instructions 52 in the instruction word 48. However, this also is not necessary for asynchronous data communications.

The above example wherein computer 12e is writing to computer 12c has been described in detail. As can be appreciated in light of the above discussion, the operations are essentially the same whether computer 12e attempts to write to computer 12c first, or whether computer 12c first attempts to read from computer 12e. The operation cannot be completed until both computers 12e and 12c are ready and, whichever computer 12e or 12c is ready first, that first computer 12 simply "goes to sleep" until the other computer 12e or 12c completes the transfer. Another way of looking at the above described process is that, actually, both the writing computer 12e and the receiving computer 12c go to sleep when they execute the write and read instructions, respectively, but the last one to enter into the transaction reawakens nearly instantaneously when both the read line 18 and the write line 20 are high, whereas the first computer 12 to initiate the transaction can stay asleep nearly indefinitely until the second computer 12 is ready to complete the process.

It is believed that a key feature for enabling efficient asynchronous communications between devices is some sort of acknowledge signal or condition. In the prior art, most communication between devices has been clocked and there is no direct way for a sending device to know that the receiving device has properly received the data. Methods such as checksum operations may have been used to attempt to insure that data is correctly received, but the sending device has no direct indication that the operation is completed. The present method, as described herein, provides the necessary acknowledge condition that allows, or at least makes practical, asynchronous communications between the devices. Furthermore, the acknowledge condition also makes it possible for one or more of the devices to "go to sleep" until the acknowledge condition occurs. Of course, an acknowledge condition could be communicated between the computers 12 by a separate signal being sent between the computers 12 (either over the interconnecting data bus 16 or over a separate signal line).

However, it can be appreciated that there is even more economy involved here, in that the method for acknowledgement does not require any additional signal, clock cycle, timing pulse, or any such resource beyond that described, to actually affect the communication.

In light of the above discussion of the procedures and means for accomplishing them, the following brief description of an example of the background method can now be understood. FIG. 6 is a flow diagram 74 depicting this method example. In an 'initiate communication' operation 76 one computer 12 executes an instruction 52 that causes it to attempt to communicate with another computer 12. This can be either an attempt to write or an attempt to read. In a 'set first line high' operation 78, which occurs generally simultaneously with the 'initiate communication' operation 76, either a read line 18 or a write line 20 is set high (depending upon whether the first computer 12 is attempting to read or to write). As a part of the 'set first line high' operation 78, the computer 12 doing so will, as described in detail previously herein. In a 'set second line high' operation 80 the second line (either the write line 20 or read line 18) is set high by the second computer 12. In a 'communicate data operation' 82 data (or instructions, or the like) is transmitted and received over the data lines 22. In a 'pull lines low' operation 84, the read line 18 and the write line 20 are released and then pulled low. In a 'continue' operation 86 the acknowledge condition causes the computers 12 to resume their operation. In the case of the present inventive example, the acknowledge condition causes an acknowledge signal 88 (FIG. 5) which, in this case, is simply the "high" condition of the acknowledge line 72.

FIG. 7 is a detailed diagram showing a section 100 of the computer array 10 of computers 12 in FIGS. 1 and 2 as it pertains to an exemplary embodiment that is in accord with the present invention. To emphasize that the section 100 employs the present invention, however, the computers (nodes, cores, etc.) now are referred to as CPUs 12.

As can be seen in FIG. 7, a central CPU 12e is connected to neighboring CPUs 12a, 12b, 12c, and 12d via respective data buses 16 that each include a read line 18, a write line 20, and eighteen data lines 22. In a CPU 12, however, the buses 16 are internally connected and if more than one port 38 (FIG. 3) were to be read at the same time it could create undefined hardware states. This condition should be accounted for in software design, to allow recovery from such situations.

The CPU 12e has its own memory 102 (e.g., the RAM 24 and the ROM 26 shown in FIG. 3), which can contain its own software 104. The CPU 12e also has a set of registers 40 to contain manipulation pointers for operations. These include an A register 40a and a B register 40b for data operations, a P register 40c to hold a program pointer, and an I/O control and status register (IOCS register 40d) (see also, FIG. 3).

FIG. 8a-f are table diagrams showing an overview of port address decoding that is usable in the CPUs 12 of the section 100 in FIG. 7. FIG. 8a shows that when an address bit 108 in a register 40 is set to "1" the register 40 is usually addressing one or more of the ports 38. Conversely, not shown, when the address bit 108 is "0" the register 40 is addressing a location in the memory 102. When the address bit 108 is set high the next eight bits act as select bits 110 that then specify which particular port 38 or ports 38 are selected and whether they are to be read from or written to. Thus, for the registers 40 in CPU 12e "Right" indicates the neighboring rightward or eastward CPU 12a, "Down" indicates the neighboring downward or southward CPU 12b, "Left" indicates the neighboring leftward or westward CPU 12c, and "Up" indicates the neighboring upward or northward CPU 12d. A select bit 110 that is set for an action of "RR" indicates a pending read request and a select bit 110 that is set for an action of "WR" indicates a pending write request.

Note, for consistency and to minimize confusion we stick to the general convention here that a high value or "1" denotes a true condition and a low value or "0" denotes a false condition. This is not a requirement, however, and alternate conventions can be used. For example, some presently preferred embodiments of the CPUs 12 use "0" for true in the RR bit locations and use "1" for true in the WR bit locations.

In passing, it should be noted that this port address decoding approach also permits the address bit 108 to be set to "1" and none of the select bits 110 to be set. This can beneficially be used to address another element in the CPU 12. For example, the IOCS register 40d can be addressed in this manner.

In present embodiments of the CPUs 12, the IOCS register 40d uses the same port address arrangement to report the current status of the read lines 18 and write lines 20 of the ports 38. This makes these respective bits in the IOCS register 40d useful to permit programmatically testing the status of I/O operations. For example, rather than have CPU 12e commit to an asynchronous read from CPU 12b, wherein CPU 12e will go to sleep if CPU 12b has not yet set the shared write line 20 high, CPU 12e can test the state of bit 13 (Down/WR) in the IOCS register 40d (reflecting the state of the write line 20 that connects CPU 12b to CPU 12e) and either branch to and immediately read the ready data from CPU 12b or branch to and immediately execute another instruction.

FIG. 8b shows a simple first example. Here the select bit 110 for Right/RR is set, indicating that port 38b is to be read from. FIG. 8c shows a simple second example. Here the select bit 110 for Right/WR is set, now indicating that port 38b is to be written to.

Conventionally, only one select bit 110 would be enabled to specify a single port 38 and a single action (read or write) at any given time. Multiple high bits would then be decoded as an error condition. The novel approach disclosed herein, however, does not follow this convention. Rather, more than one of the select bits 110 for the ports 38 may be beneficially enabled at the same time, thus requesting, multiple read and/or write operations. In such cases, the data is presented on all of the respective ports 38, including a signal that the new data is present.

FIG. 8d-f show some examples of multiple read and/or write operations. FIG. 8d shows how a register 40 in CPU 12e can concurrently specify a read from CPU 12b and a write to CPU 12a. FIG. 8e shows how a read from CPU 12b and a write to CPU 12c can concurrently be specified. And FIG. 8f shows specifying a read from CPU 12b and a write to either CPU 12a or CPU 12c. [As foreshadowing, one can compare FIG. 8d-f with FIG. 9 and the data transfer paths represented by arrows 132 and 134 there.]

In practice during a multiple write, the CPU 12e will present the data and set the write lines 20 high on the buses 16 that it shares with one or more of the target CPUs 12a, 12b, 12c, or 12d. The source CPU 12e then will wait until it receives an indication that the data has been read. At some eventual point, presumably, one or more of the target CPUs 12a, 12b, 12c, or 12d sets its respective read line 18 high on the bus 16 shared with CPU 12e. A target CPU 12 then formally reads the data and pulls both the respective read line 18 and write line 20 low on the bus 16 shared with CPU 12e, thus acknowledging receipt of the data from CPU 12e.

FIG. 9 is a schematic block diagram depicting how the multiple-write approach illustrated in FIG. 7 and FIG. 8d-f can particularly be combined with an ability to include up to four instructions in one data word 120. Each instruction is typically five bits, so the 18-bit wide data word 120 holds about four instructions. The last instruction then can be only three bits, but that is sufficient for many instructions. One notably beneficial aspect of this is that it permits using very efficient data transfer mechanisms.

In the following, @=fetch, !=store, and p refers to the "program counter" or P register 40c. The "+" in @p+ and !p+ refer to incrementing a memory address in the register after execution, except that the register content is not incremented if it addresses another register or a port. Thus, the "+" in these latter cases differentiates these instructions as "special" rather than as normal @p and !p instructions.

FIG. 9 presents an example of how a single instruction-sequence program to transfer data from one CPU 12 to another can be included in a single 18-bit data word 120 with just the P register 40c used to read and write the data. Here "@p+" is the instruction 122 loaded in slot zero 54a. This is a literal operation that fetches the next 18-bit data word 120 from the current address specified in the P register 40c, pushes that data word 120 onto the data stack 34. [And generally would increment the address in the P register 40c, except that this is not done when that address is for a register or a port, and here the address bit 108 in the P register 40c will indicate that ports are being specified.] Next, "." is the instruction 124 loaded in slot one 54b. This is a simple nop operation (no operation) that does nothing. And next, "!p+" is the instruction 126 loaded in slot two 54c. This is a store operation that pops the top data word 120 from the data stack 34, writes this 18-bit data word 120 to the current address specified in the P register 40c. Note, the address specified in the P register 40c has not changed, it just functionally causes different neighboring CPUs 12 to be accessed. Finally, "unext" is the instruction 128 loaded in slot three 54d. This is a micro-next operation that operates differently depending on whether the top of the return stack 28 is zero. When the return stack 28 is not zero, the micro-next causes the return stack 28 to be decremented and for execution to continue at the instruction in slot zero 54a of the currently cached data word 120 (that is, again at instruction 122 in the example here). Note particularly, the use of the micro-next here does not require a new data word 120 to be fetched. In contrast, when the return stack 28 is zero, the micro-next fetches the next data word 120 from the current address specified in the P register 40c, and causes execution to commence at the instruction in slot zero 54a of that new data word 120.

For this particular example the P register 40c can be loaded with 101100000b and the top of the return stack 28 can contain 101b (5 decimal). Since the P register 40c contains 101100000b (see e.g., FIGS. 8a and 8d), the "@p+" in instruction 122 here instructs CPU 12e to read (via its port 38d) a next data word 120 from CPU 12b and to push that data word 120 onto the data stack 34. The address in the P register 40c is not incremented, however, since that address is for a port. The "." nop in instruction 124 here is simply a filler, serving to fill up the 18 bits of the current data word 120. Next, since the P register 40c still contains 101100000b, the "!p+" in instruction 126 here instructs CPU 12e to pop the top data word 120 off of the data stack 34 (the very same data word 120 just put there by instruction 122) and to write that data word 120 (via port 38b) to CPU 12a. Again, the address in the P register 40c is not incremented because that address is for a port. Then the "unext" in instruction 128 causes the return stack 28 to be decremented to 100b (4 decimal) and for execution to continue at instruction 122. And the single word program in instructions 122, 124, 126, and 128 continues in this manner, decrementing the return stack 28 to 011b, 010b, 001b, and ultimately 000b (0 decimal), fetching the next data word 120 from CPU 12b, and executing the instruction in slot zero 54a of this new data word 120.

In summary, the P register 40c in the example here is loaded with one address value that specifies both a source and destination (ports 38d and 38b and thus CPUs 12b and 12a), the return stack 28 has been loaded with an iteration count (5). Then five data words 120 are efficiently transferred ("pipe-lined") through CPU 12e, which then continues at the instruction in slot zero 54a of a sixth data word 120 also provided by CPU 12b.

Various other advantages flow from the use of this simple but elegant approach. For instance, the A register 40a and the B register 40b need not be used and thus can be employed by CPU 12e for other data purposes. Following from this, pointer swapping (trashing) can also be eliminated when performing data transfers.

For example, a conventional software routine for data pipelining would at some point read data from an input port and at another point write data to an output port. For this at least one pointer into memory would be needed, in addition to pointers to the respective input and output ports that are being used. Since the ports would have different addresses, the most direct way to proceed here would be to load the input port address onto a stack with a literal instruction, put that address into an addressing register, perform a read from the input port, then load the address of the output port onto the stack with a literal instruction, put that address into an addressing register, and perform a write to the output port.

The two literal loads in this approach would take 4 cycles each, and the two register set instructions will take 1 cycles each. That is a total of 10 cycles spent inside of the loop just on setting the input and output pointers. Furthermore, there is an additional penalty when such pointer swapping is needed because three words of memory are required inside of the loop, thus not allowing the use of a loop contained inside a single 18-bit word. Accordingly, an instruction loop in this example will require a branch with a memory access, which adds 4 cycles of further overhead and makes the total pointer swap and loop overhead at least 14 cycle.

In contrast, however, since multi-port addressing is possible in the CPU 12, the address that selects both the input port 38 and the output port 38 can be loaded outside of an I/O loop and used for both input and output. This approach works because data from only one neighbor is read during a multi-port read and only one neighbor reads during a multi-port write. Thus the 14-cycle overhead inside of a loop that would traditionally be spent setting the input and output pointers is not needed. The loop still has a read instruction and a write instruction, but these can now both use the same pointer, so it does not have to be changed.

This means that the use of the multi-port write technique can reduce the overhead of some types of I/O loops by 14 cycles (or more). It has been the inventors' observation that, in the best case, this permits a reduction from 23 cycles to 6 cycles in the processing loop of a CPU 12. In a situation where one cycle takes approximately one nanosecond, this represents an increase from 43 MHz to 167 MHz in effective processor speed, which represents a considerable improvement.

Briefly continuing now with FIG. 8f and again with FIG. 9, these show how multi-writes can be performed even with single word programs. Here the CPU 12e reads from CPU 12b and writes to either of CPU 12a or CPU 12c. In effect, the pipelining here is to the first available of CPU 12a or CPU 12c. This illustrates the added flexibility possible in the CPUs 12, and is merely one possible example of how CPUs 12 in accord with the present invention are useful in ways heretofore felt to be too difficult or impractical.

Summarizing, the CPUs 12 have to deal with both reading and jumping to ports 38. In reading from, or jumping to, a multi-port address, WHICH port 38 that data or instruction is gotten from is unknown without explicit code being executed to find out. (The fastest way relies on the ports 38 being the same for both CPUs 12.) Traditionally this would be seen as a problem to avoid, because different data or code could come from different ports. However, in the cooperative environment postulated, the inventors have been figuring out how to turn everything into a benefit. And this is such a case.

If a CPU 12 executes from a multiport address, and all of the addressed neighbor CPUs 12 are writing cooperatively (i.e., synchronized), one neighbor CPU 12 can be supplying the instruction stream while different CPUs 12 provide the literal data. The literal fetch opcode (@p+) causes a read from the multi-port address in the P register 40c that selectively (not all literals need to do this) can be satisfied by different neighboring CPUs 12. This merely requires extensive "cooperation" between the neighboring CPUs 12.

In the pipeline multi-port usage, however, where one neighbor CPU 12 is reading and one CPU 12 is writing, reads and writes to the same multi-port address do not cause problems. The idea is that jumping to such a multi-port address and executing the literal store opcode (!p+) allows the P register 40c to address two ports 38 with complete safety. This frees up BOTH the A register 40a and the B register 40b for local use.

Various additional modifications may be made to the present invention without altering its value or scope. For example, while this invention has been described herein in terms of read instructions and write instructions, in actual practice there may be more than one read type instruction and/or more than one write type instruction. As just one example, in one embodiment of the invention there is a write instruction that increments the register and other write instructions that do not. Similarly, write instructions can vary according to which register 40 is used to select communications ports 38, or the like, as discussed previously herein. There can also be a number of different read instructions, depending only upon which variations the designer of the computers 12 deems to be a useful choice of alternative read behaviors.

Similarly, while the present invention has been described herein in relation to communications between computers 12 in an array 10 on a single die 14, the same principles and method can be used, or modified for use, to accomplish other inter-device communications, such as communications between a computer 12 and its dedicated memory or between a computer 12 in an array 10 and an external device (through an input/output port, or the like). Indeed, it is anticipated that some applications may require arrays of arrays—with the presently described inter device communication method being potentially applied to communication among the arrays of arrays.

While specific examples of the inventive computer array 10 and computer 12 have been discussed therein, it is expected that there will be a great many applications for these which have not yet been envisioned. Indeed, it is one of the advantages of the present invention that the inventive method and apparatus may be adapted to a great variety of uses.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

What is claimed is:

1. A computer, comprising:
   a plurality of data paths connecting the computer to other devices; and
   a register having bits programmatically settable to address each of said plurality of data paths such that the computer can communicate via multiple of said plurality of data paths based on which said bits are concurrently set; and
   wherein said register has bits respectively representing instances of said other devices as source devices that the computer can read data from and instances of said other devices as destination devices that the computer can write data to, thereby permitting a single address in said register to represent both a source device and a destination device for data communicated by the computer.

2. The computer of claim 1, wherein:
   the computer communicates asynchronously.

3. The computer of claim 1, wherein:
   the computer includes stack storage elements; and
   the computer employs only said register and said stack storage elements to read data from a first said other device and to write said data to a second said other device.

4. The computer of claim 1, wherein: the computer includes stack storage elements;
   the computer employs instruction words having sufficient length to include multiple instructions and can execute instances of said instructions present in a said instruction word that is present on a said data path; and
   the computer employs only said register, stack storage elements, and a program in a single said instruction word to read data from a first said other device and to write said data to a second said other device.

5. The computer of claim 1, wherein:
   the computer reads data from a said other device via a first said data path that is specified by said register; and
   the computer writes data to a different said other device via a second said data path that is concurrently specified by said register.

6. The computer of claim 5, wherein:
   the computer can read data from one of multiple said other devices that are concurrently specified by said register; or
   the computer can write data to multiple said other devices that are concurrently specified by said register; and
   the computer reads from a first said other device that provides said data and writes to a second said other device that accepts said data.

7. The computer of claim 1, wherein:
   said bits in said register defining said other devices from which the computer can read are read bits;
   said bits in said register defining said other devices to which the computer can write are write bits;
   the computer attempts to read from all of said second other devices when corresponding said read bits are set; and
   the computer attempts to write to all of said second other devices when corresponding said write bits are set.

8. The computer of claim 1, wherein:
   the computer is pan of a computer array and at least one of said other devices is also a computer in said computer array.

9. A process for a computer to communicate data, comprising:
   (a) monitoring a plurality of data paths connecting the computer to other devices for a signal that a first one of said other devices is seeking to write the data to the computer;
   (b) reading the data from said first one of said other devices; and
   (c) writing the data to a second one of said other devices based on a register having bits programmatically settable to address said plurality of data paths; and
   wherein said (a) includes monitoring only said data paths having respective bits set in said register, thereby permitting a single address in said register to represent both a source device and a destination device for the data being communicated.

10. The process of claim 9, wherein:
the computer is part of a computer array and at least one of said other devices is also a computer in said computer array.

11. The process of claim 9, wherein:
at least one of said (b) and said (c) is performed asynchronously.

12. The process of claim 9, wherein:
said (b) includes attempting to read from all of said other devices having respective bits set in said register.

13. The process of claim 9, wherein:
said (c) includes attempting to write to all of said other devices having respective bits set in said register.

14. The process of claim 9, wherein:
said (a) includes ceasing said monitoring responsive to receiving a first said signal, thereby ensuring that said reading is from a said other device associated with said first said signal.

15. The process of claim 9, wherein the data includes a series of data words, and further wherein:
said (b) includes reading each said data word directly from a said data path into a stack storage element in the computer; and
said (c) includes directly writing each said data word directly from said stack storage element to a said data path.

16. the process of claim 9, wherein the computer includes stack storage elements and employs instruction words having sufficient length to include multiple instructions, and further wherein:
said (b) and said (c) include employing only said register, stack storage elements, and a program in a single said instruction word.

17. The process of claim 16, further comprising:
receiving said single said instruction word on a said data path.

* * * * *